(12) United States Patent
Gajjela et al.

(10) Patent No.: US 11,781,077 B2
(45) Date of Patent: Oct. 10, 2023

(54) DISAGGREGATION OF BIOMASS PYROLYSIS OIL

(71) Applicant: ALDER ENERGY, LLC, Charleston, SC (US)

(72) Inventors: Sanjeev Gajjela, Didcot (GB); Ralph Phillips Overend, Ottawa (CA); Zhiheng Wu, Beeston (GB); Zsuzsa Ajsa Mayer, Oxfordshire (GB); Haonan Wu, Nottinghamshire (GB); Jose Antonio Medrano Catalan, Didcot (GB)

(73) Assignee: ALDER ENERGY, LLC, Boulder, CO (US)

( * ) Notice: Subject to any disclaimer, the term of this patent is extended or adjusted under 35 U.S.C. 154(b) by 0 days.

(21) Appl. No.: 17/668,359

(22) Filed: Feb. 9, 2022

(65) Prior Publication Data
US 2022/0389333 A1    Dec. 8, 2022

Related U.S. Application Data

(63) Continuation of application No. 16/341,766, filed as application No. PCT/GB2016/051735 on Jun. 10, 2016, now Pat. No. 11,421,165.

(30) Foreign Application Priority Data

Jun. 24, 2015    (GB) ...................................... 1511106

(51) Int. Cl.
| | |
|---|---|
| *C10G 53/14* | (2006.01) |
| *B01D 3/14* | (2006.01) |
| *B01D 3/34* | (2006.01) |

(52) U.S. Cl.
CPC ............... *C10G 53/14* (2013.01); *B01D 3/14* (2013.01); *B01D 3/34* (2013.01); *C10G 2300/1014* (2013.01); *C10G 2300/44* (2013.01)

(58) Field of Classification Search
CPC ............ C10G 53/14; C10G 2300/1014; C10G 2300/44; B01D 3/14; B01D 3/34
See application file for complete search history.

(56) References Cited

U.S. PATENT DOCUMENTS

| 4,942,269 A | 7/1990 | Chum et al. |
| 6,193,837 B1 | 2/2001 | Agblevor et al. |

(Continued)

FOREIGN PATENT DOCUMENTS

| CN | 101531922 A | 9/2009 | | |
| WO | WO 2009/042622 A2 * | 4/2009 | ............... | C12P 7/02 |

OTHER PUBLICATIONS

Tanneru, S.K. et al, 2014, Energy, 73, 214-220.*

(Continued)

*Primary Examiner* — Brian A McCaig
(74) *Attorney, Agent, or Firm* — Fish & Richardson P.C.

(57) ABSTRACT

Described is a novel process for disaggregating biomass pyrolysis oil quantitatively into energy dense hydrophobic aromatic fraction (HAF), fermentable pyrolytic sugars and phenolics based products in a highly economical and energy efficient manner. Phase separation of the esterified pyrolysis oil after an oxidative pre-treatment and the quantitative recovery of the separate fractions is described. Phase separation uses batch as well as continuous reactor systems. The resulting HAF is an energy dense, thermally stable, water free, non-corrosive to carbon steel, and is a free flowing liquid suitable for combustion and for upgrading to transportation fuels. Pyrolytic sugars which are mainly anhydrosugars can be further converted by fermentation to ethanol (Continued)

or other products. Monomeric phenols are useful industrial intermediates and the organic acids in the original pyrolysis oil are mainly recovered as esters of the separation solvents.

30 Claims, 12 Drawing Sheets

(56) References Cited

U.S. PATENT DOCUMENTS

| | | | |
|---|---|---|---|
| 8,022,260 | B2 | 9/2011 | O Connor et al. |
| 8,192,627 | B2 | 6/2012 | Gallop et al. |
| 8,323,456 | B2 | 12/2012 | Lin et al. |
| 8,822,745 | B2 | 9/2014 | Fjare et al. |
| 8,961,794 | B2 | 2/2015 | Fjare et al. |
| 9,212,313 | B2 | 12/2015 | Pollard et al. |
| 9,222,044 | B2 | 12/2015 | Traynor et al. |
| 9,303,213 | B2 | 4/2016 | Lin et al. |
| 9,387,415 | B2 | 7/2016 | Sanchez et al. |
| 10,351,783 | B2 | 7/2019 | Tanzio et al. |
| 10,457,873 | B2 | 10/2019 | Stamires et al. |
| 10,457,882 | B2 | 10/2019 | Brown et al. |
| 10,633,605 | B2 | 4/2020 | Asikkala et al. |
| 10,920,150 | B2 | 2/2021 | Chiaberge et al. |
| 2009/0054711 | A1 | 2/2009 | Lawrence et al. |
| 2013/0291431 | A1 | 11/2013 | Steele et al. |
| 2013/0306557 | A1 | 11/2013 | Moore et al. |
| 2014/0020281 | A1 | 1/2014 | Lin et al. |
| 2014/0259888 | A1 | 9/2014 | Wang et al. |
| 2014/0330057 | A1 | 11/2014 | Dijs et al. |
| 2015/0183961 | A1 | 7/2015 | Talwar |
| 2015/0184025 | A1 | 7/2015 | Talwar |
| 2015/0184098 | A1 | 7/2015 | Talwar |
| 2016/0317947 | A1 | 11/2016 | Sanchez et al. |
| 2019/0330540 | A1 | 10/2019 | Gajjela et al. |

OTHER PUBLICATIONS

Figueirêdo, M.B. et al, 2020, Journal of Analytical and Applied Pyrolysis, 149, 12 pp. <https://doi.org/10.1016/j.jaap.2020.104837>.*
Bennett et al., "Extraction and hydrolysis of levoglucosan from pyrolysis oil," Bioresource Technology, 2009, 100:6059-6063.
Hansen, "The Three Dimensional Solubility Parameter and Solvent Diffusion Coefficient," Dissertation for the degree of Technical Doctorate of Engineering, Polytechnic School of Engineering at the Technical University of Denmark, Aug. 1967, 103 pages.
International Preliminary Report on Patentability in International Appln. No. PCT/GB2016/051735, dated Dec. 26, 2017, 8 pages.
International Preliminary Report on Patentability in International Appln. No. PCT/GB2017/052147, dated Nov. 16, 2018, 14 pages.
International Search Report and Written Opinion in International Appln. No. PCT/GB2016/051735, dated Dec. 29, 2016, 11 pages.
International Search Report and Written Opinion in International Appln. No. PCT/GB2017/052147, dated Oct. 30, 2017, 13 pages.
Lehto et al., "Fuel oil quality and combustion of fast pyrolysis bio-oils," VTT Technology 87, 2013, 84 pages.
Li et al., "Effects of acid and metal salt additives on product characteristics of biomass microwave pyrolysis," Journal of Renewable and Sustainable Energy, 2016, 8:063103, 13 pages.
Lindfors et al., "Fractionation of Bio-Oil," Energy Fuels, Aug. 2014, 28(9):5785-5791.
Ma'ruf et al., "Paper: Lignin isolation process from rice husk by alkaline hydrogen peroxide: Lignin and silica extracted," Paper, Presented at Proceedings of the AIP Conference Proceedings: International Conference on Chemistry, Chemical Processes, and Engineering (IC3PE) 2017, Yogyakarta, Indonesia, Nov. 15-16, 2016, 1823:020013-020013-5.
Oasmaa et al., "Paper: Fast Pyrolysis of Biomass into Fuels and Chemicals," Paper, Presented at Proceedings of the The 6th Nordic Wood Biorefinery Conference, Helsinki, Finland, Oct. 20-22, 2015, 220-224.
Office Action in European Appln. No. 17749210.5, dated Oct. 19, 2020, 4 pages.
Onarheim et al., "Process Simulation Development of Fast Pyrolysis of Wood Using Aspen Plus," Energy Fuels, Dec. 2014, 29(1):205-217.
Park, et al., "Separation of Switchgrass Bio-Oil by Water/Organic Solvent Addition and pH Adjustment," Energy & Fuels, Jan. 2016, 30(3):2164-2173.
Scholze & Meier, "Characterization of the water-insoluble fraction from pyrolysis oil {pyrolytic lignin). Part I. PY-GC/MS, FTIR, and functional groups," Journal of Analytical and Applied Pyrolysis, 2001, 60:41-54.
Search Report in Great Britain Appln. No. GB1511106.5, dated Apr. 28, 2017, 2 pages.
Search Report in Malaysian Appln. No. PI2019003041, dated Dec. 21, 2021, 3 pages.
Song et al., "Effective phase separation of biomass pyrolysis oils by adding aqueous salt solutions," Energy Fuels, Jun. 2009, 23(6):3307-3312.
Xu et al., "Bio-Oil Upgrading by Means of Ozone Oxidation and Esterification to Remove Water and to Improve Fuel Characteristics," Energy Fuels, Mar. 2011, 25(4):1798-1801.
Xu et al., "Rice husk bio-oil upgrading by means of phase separation and the production of esters from the water phase, and novolac resins from the insoluble phase," Biomass and Bioenergy, Jul. 2010, 34(7):1059-1063.
Zilnik and Jazbinsek, "Recovery of renewable phenolic fraction from pyrolysis oil," Separation and Purification Technology, Feb. 2012, 86:157-170.

* cited by examiner

DISAGGREGATION OF BIOMASS PYROLYSIS OIL

FIELD OF THE INVENTION

The present invention relates to the comprehensive pyrolysis oil upgrading approach to develop processes and methods for recovering value-added products e.g. precursors for fuel range hydrocarbons, fuel oils, fuel additives, and fuel blends; concentrated fermentable sugars; industrial solvents, and chemicals from pyrolysis oil derived from fast pyrolysis of lignocellulosic biomass.

BACKGROUND OF THE INVENTION

In recent years, thermochemical utilisation of biomass in the energy sector has attracted renewed interest worldwide. The reason being, while the output of the other renewable energy sources is primarily electricity, biomass is able to produce liquid, gaseous, or solids of variable energy contents that can be used for energy or chemicals production. Pyrolysis oil (PO) is a free flowing liquid product produced from biomass fast pyrolysis. In the fast pyrolysis process, biomass is rapidly heated to 450-550° C. in the absence of oxygen, with short residence time and rapidly quenched to produce a condensate, which is known as PO, bio-oil or bio-crude. Depending on the process conditions and the condensation train, PO can be either a mobile single phase, or a two phase mixture comprising a heavy viscous fraction and an aqueous low viscosity fraction with light organic molecules. PO has been recognised as a renewable feedstock for the production of transportation fuels and various other green applications.

PO as a fuel has many environmental advantages when compared to fossil fuels. Upon combustion, PO produces half of the $NO_x$, negligible quantities of $SO_x$, emissions when compared with fossil fuels, and is $CO_2$ neutral. However, the large-scale production of liquid fuels from PO has so far been limited because of its high acidity and thermal instability. Furthermore, PO has high water content (25-30%), high oxygen content (40-50%), is immiscible with fossil fuels, and undergoes phase separation and an increase in viscosity during prolonged storage (aging).

PO is a complex mixture containing various kinds of oxygen-containing organics (e.g. acids, aldehydes, alcohols, phenols, phenolic derivatives, sugars, and others with multiple functional groups). These oxygen-containing organic compounds make PO unstable, corrosive, and incompatible with conventional fuel and directly affect its commercial applications. Therefore, it is necessary to upgrade the raw PO before it can be used as a viable renewable fuel. Currently there are no commercial technologies that will produce fungible renewable fuels from PO. Novel technologies need to be developed that can generate sufficient renewable fuel volumes to replace or to blend with the current petroleum sources. Therefore, new methods and processes for upgrading PO are required.

A number of PO upgrading technologies have been proposed to improve the product properties and to increase the range of possible applications. Major upgrading technologies include hydrodeoxygenation (HDO) and hydrocracking. Hydrogen consumption is very high for both these technologies, which in turn affects the scale up and economics of the processes. It has become customary to practise the hydroprocessing of PO by utilizing a 2-stage approach in which the $1^{st}$ stage comprises a hydrotreating stage utilizing a mild temperature (<300° C.) for the reaction. This $1^{st}$ stage reduces the polymerization of PO that occurs when raw PO is subjected to temperatures >100° C. Hydrocracking the lightly hydrotreated product is then practised in a $2^{nd}$ stage reaction at higher temperature (>350° C.). The 2 stage hydroprocessing method usually requires two reactors which increases the capital cost of the hydroprocessing technology; more reaction time is also required increasing variable costs. Even without the considerations of high hydrogen consumption, these technologies face major challenges in terms of corrosion, catalyst fouling, catalyst stability and product selectivity.

Alternatively, a number of studies have been reported dealing with chemical upgrading of PO by esterification reaction with alcohol at mild conditions using mineral acid catalysts e.g. sulphuric acid, or various heterogeneous catalysts including resin acid catalysts. From a chemical point of view, it is anticipated that the organic acids and aldehydes are converted by the reactions with alcohols to esters and acetals, respectively. The product from the above mentioned process with different catalysts still contains high amount of water, has low calorific value, and high amounts of alcohol. The undesirable properties of PO are correlated with certain types of compounds. Acids contribute to the corrosiveness of PO, and the instability of PO is mainly caused by the aldehydes, furans, ketones and phenols. Hence these should be suppressed in the final product. Also, pyrolytic sugars are present ~14-33% mass ratio in many POs depending on the feedstock, and process conditions.

Oxygenates with furanic rings, are most likely to form coke with aldehydes because of their thermal reactivity. These precursors react on the catalytic surfaces and fill up the pores, which contributes to inactivation of catalysts during the upgrading and hydrodeoxygenation process of PO. Small aldehyde molecules are easily condensed together with aromatics to form polymers. Although increasing the hydrogen pressure and reaction temperature while reducing the acidity of the catalyst can drive down coking on the catalyst surface, it is a significant challenge to minimize the hydrogen consumption and coking at mild conditions.

Effective separation of pyrolytic sugars and phenolic oligomers offers an array of industrial opportunities and also improves the quality of the PO for further processing. Pyrolytic-sugars can be useful for direct upgrading to liquid transportation fuels and/or fermentation to corresponding alcohols. Successful pyrolytic-sugars separation/removal also has potential for pharmaceutical applications. Phenolic oligomers have potential to be used in various applications that include resins, binders, asphalt, coatings, adhesives, aromatic chemicals, unique polymers, production of fuels and preservatives.

Currently, most of the PO upgrading processes involve either hydrotreating or chemical transformation or dewatering methods to fractionate and recover specific value-added components. So there is a definite need to develop a comprehensive PO upgrading process to realise the full potential of the PO i.e. to produce various product streams from PO each of which can have maximum value.

SUMMARY OF THE INVENTION

The present invention relates to a process for converting PO obtained by pyrolysis of biomass into high quality fuel/boiler fuel/marine fuel, chemicals and fuel blends, pyrolytic sugars, phenolic oligomers and alkyl esters. In certain embodiments, a process for fractionating or phase separating the PO these fractions subsequently being used to produce specific high-value products, comprising, a) pre-treating the PO with one or more oxidizing agents in a reactor to form a product mixture comprising an oxidized product by converting aldehyde and ketone groups to acids, b) contacting the oxidised product with one or more alcohol species with an esterification catalyst in a reactor under reaction conditions sufficient to produce phase separation of the treated PO, c) the organic phase of the phase separated product after the esterification process is further vacuum distilled to recover the solvent as well as hydrophobic aromatic fraction (HAF) as the primary product, and d) the aqueous phase of the phase separated product after the esterification process is further processed by liquid-liquid extraction with solvents to extract and recover pyrolytic sugars and mono phenolics.

The approach as disclosed in the current invention provides a low cost method to produce rapid phase separation of the PO into an aqueous phase comprising mainly pyrolytic sugars, and an organic phase comprising HAF, solvent and ester. The approach has been demonstrated to function with many different POs made from a wide range of lignocellulosic biomass. The HAF and the solvent phase has less than 5% mass fraction of water remaining thus enabling distillation of the solvent from said HAF. The remaining molecular bound water in the distillate and the HAF pyrolysis oil can be easily removed via dehydration with solid absorbents. Water removal is important because PO contains a substantial amount of dissolved water, typically 15-30% mass fraction, which decreases the heating value and causes corrosion when in contact with carbon steel. Correlations for the required amount of alcohol for esterification phase separation are derived in proportion to the measured quantity of the pyrolignin present in the corresponding PO. The product streams produced by the invention include among other options fuel/boiler fuel/marine fuel, chemicals and fuel blend, pyrolytic sugars, phenolic monomers and alkyl esters. FIGS. 1 and 2 are overviews of the entire process with a continuous stirred tank reactor (CSTR) and Ultasonicator assisted reactor systems.

In accordance with some exemplary embodiments, the reactions described in this document are carried out in any system of suitable design, including systems comprising batch, semi-batch, continuous-flow (such as CSTR and plug flow reactors) and also batch and continuous-flow high throughput ultrasonicators (CUR). With regard to the ultrasonic assisted reactor systems, such systems typically have a working temperature of 40-100° C., although reactions can be carried out beyond this range. The flow rate of materials through the reactor is dependent on the size of the reservoir and the number of sonotrodes, but is usually 1-4 L/hour, and reactions can be completed within 30-180 minutes.

In an exemplary embodiment and in referring to FIG. 1, a process for treating a PO is provided comprising;
a) providing a PO;
b) measuring the amount of pyrolignin in the PO;
c) contacting said PO with at least one oxidising agent (e.g. hydrogen peroxide) under conditions effective (25 to 70° C.; 0.5 to 3 hr) to pre-treat the PO in a CSTR;
d) further the pre-treated oil is contacted with high boiling point alcohol (e.g. n-butanol) or a mixture of alcohols and acid catalysts (e.g. sulphuric acid) under conditions effective (25 to 120° C.; 0.5 to 4 hr) in a CSTR to phase separate the PO into a water insoluble organic phase containing lignin/phenolic species (HAF); and also an aqueous phase containing pyrolytic sugars, organic acids and phenolic species;
e) physically separate the water insoluble organic phase from the aqueous phase; and
f) remove the alcohol/esters in its component form from the organic phase by vacuum distillation to produce a high density HAF, which is free from water and pyrolytic sugars.
g) further the HAF is hydrotreated to produce fuel range hydrocarbon products.
h) extract and recover the pyrolytic sugars and phenolics as products from the aqueous phase using liquid-liquid extraction followed by vacuum distillation.

In yet another exemplary embodiment and referring to FIG. 2, a process for treating a PO is provided comprising
a) providing a PO;
b) measuring the amount of pyrolignin in the PO;
c) contacting said PO with at least one oxidising agent, for example hydrogen peroxide under conditions effective (25 to 70° C.; 0.5 to 3 hr) to pre-treat the PO in a CUR;
d) further the pre-treated oil is contacted with high boiling point alcohol (e.g. n-butanol) or a mixture of alcohols in the presence of an acid catalyst (e.g. sulphuric acid) under conditions effective (25 to 120° C.; 0 to 4 hr) in a CUR to phase separate the PO into a water insoluble organic phase containing lignin/phenolic species (HAF); and also an aqueous phase containing pyrolytic sugars, organic acids and phenolic species;
e) physically separate the water insoluble organic phase from the aqueous phase; and
i) remove the alcohol/esters in its component form from the organic phase by vacuum distillation to produce a high density HAF, which is free from water and pyrolytic sugars.
j) further the HAF is hydrotreated to produce fuel range hydrocarbon products.
k) extract and recover the pyrolytic sugars and phenolics as products from the aqueous phase using liquid-liquid extraction followed by vacuum distillation.

The features and advantages of the invention will be apparent to those skilled in the art. While numerous changes may be made by those skilled in the art, such changes are within the scope of the invention.

BRIEF DESCRIPTION OF THE DRAWINGS

A more complete understanding of the present invention and benefits thereof may be acquired by referring to the following description taken in conjunction with the accompanying drawings in which.

DETAILED DESCRIPTION OF THE INVENTION

Figure 1:
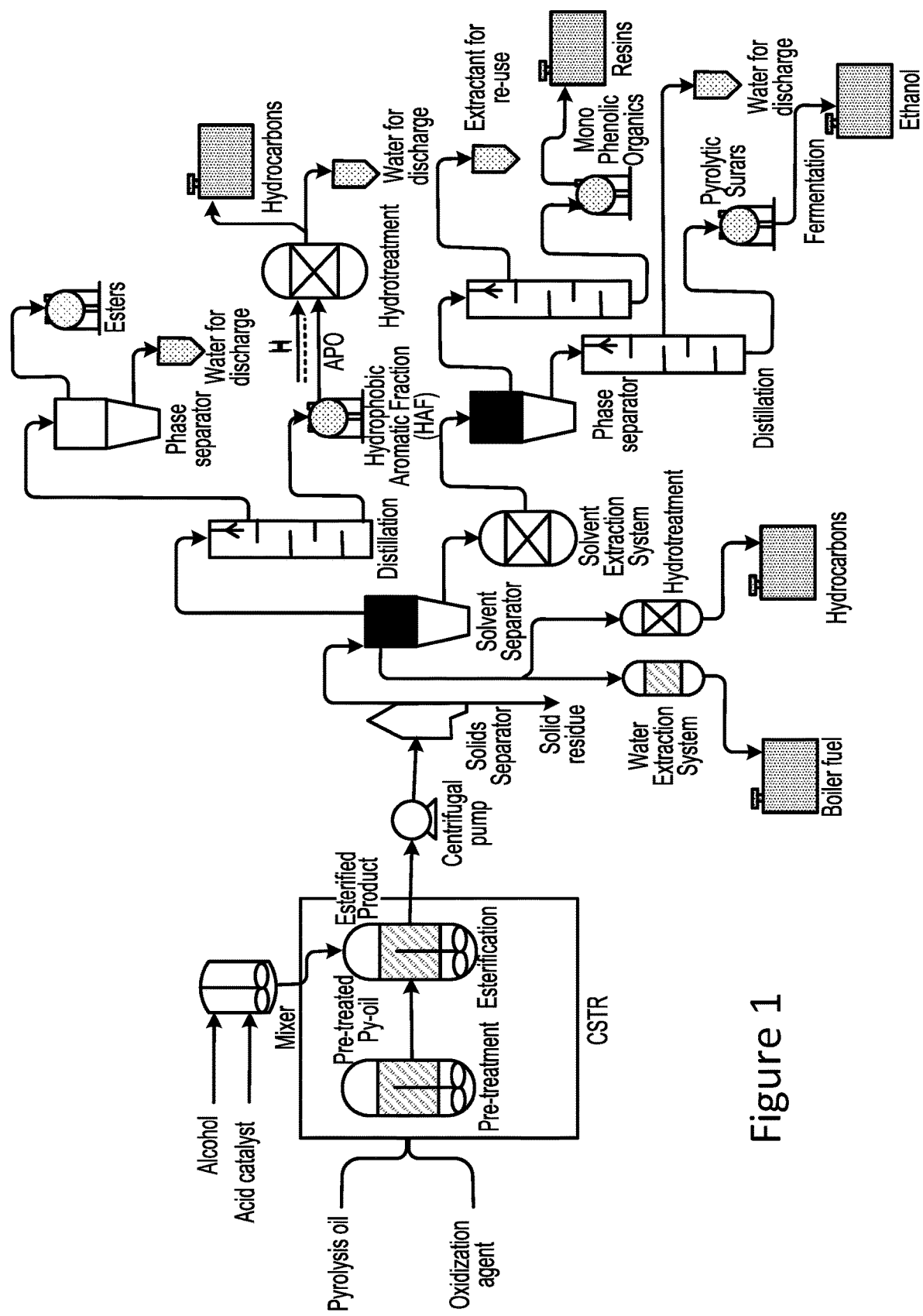
FIG. 1: Schematic representation of the steps involved in CSTR assisted disaggregation of biomass pyrolysis oil
Figure 2:
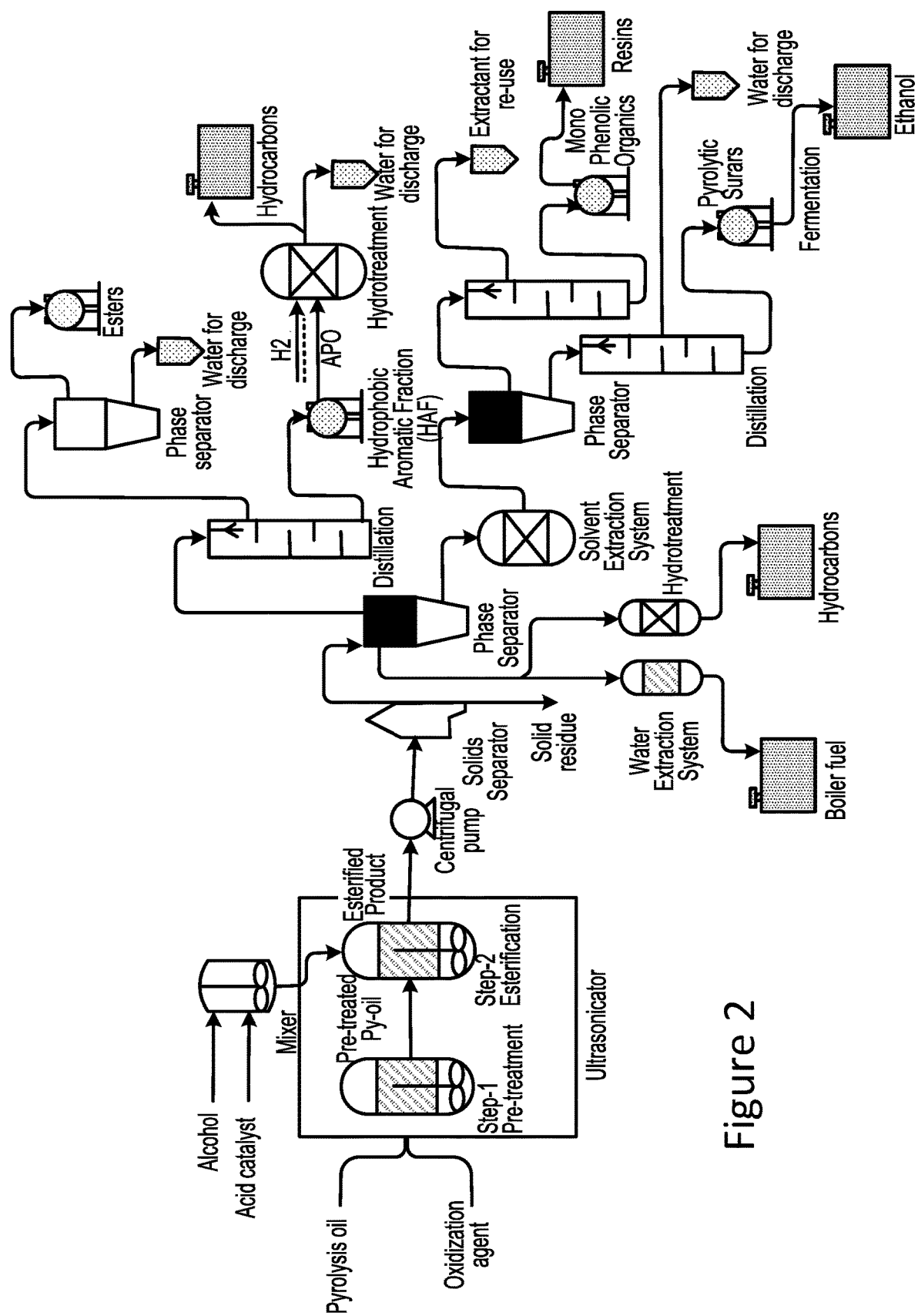
FIG. 2: Schematic representation of the steps involved in ultrasonicator assisted disaggregation of biomass pyrolysis oil

Various methods for processing biomass derived PO are provided herein. Illustrative embodiments of the invention are described below. The present invention relates to an improved biomass PO upgrading process that comprehensively utilises all the components in the PO to produce a variety of products that includes feedstock for hydroprocessing, fermentable sugars, market solvents and feedstock for resins/synthetic polymers. Specifically, the present invention seeks to produce phase separation of the PO by pre-treating the PO prior to esterification with a suitable amount and type of alcohol in the presence of catalysts at effective reaction conditions. One of the major products HAF, produced in this way will have improved properties. For instance, lower oxygen content, less acidity, high stability, high calorific value, no or low water content, and/or lower or no compounds which cause coking. Additionally this process also recycles the alcohol used, produces pyrolytic sugars and phenolic monomers as by-products. The present invention is also directed to systems for implementing such processes.

It is highly desirable to develop a unique economical and low energy intensive process to recover or extract the pyrolytic sugars, water, and phenolic monomers and simultaneously produce individual high quality product streams with improved stability and fuel properties. Although extensive research work has been performed throughout the globe to phase separate the PO and recover high value products, most of the current technologies involve either adding additional water or solvents and/or are energy intensive. There is therefore a need to develop a process by considering all the said variables.

As used herein, the term "biomass" includes wood, paper, crops, animal and plant fats, triglycerides, biological waste, algae, and the like. "Pyrolysis oil" or "Bio-oil" or "Bio-crude" as used herein, is produced from fast pyrolysis of lignocellulosic biomass and has been considered as a promising renewable fuel source.

PO produced from pyrolysis of biomass is a complex mixture containing alkenes, aromatics, phenols, furans, sugars, aldehydes, ketones, alcohols and acids, with 30-35% oxygen content, and approximately 30% mass fraction of water. Among all the chemicals in PO, those with oxygen containing functional groups, predominantly sugars, guaiacols, and furanic rings, are most likely to form coke because of their thermal instability and tendency to form polymers. Acids contribute to the corrosiveness of PO, and the instability of PO is mainly caused by the aldehydes, furans, ketones and phenols. These oxygenates can undergo homo polymerization, acetalization and oligomerization by reacting with phenols which leads to polymerization reactions that produces high molecular weight thermoplastic resins. The influence of aldehyde polymerization reactions mainly increase the viscosity of the PO, during storage or on exposure to heat. The unstable nature of PO makes its storage and further upgrading challenging, as aged PO typically shows increased water content, viscosity, and phase separation.

It is known that, aldehydes and ketones can be oxidised to corresponding carboxylic acids. Aldehydes conversion to corresponding carboxylic acid reactions proceeds via acid-catalysed hydrate formation. The oxidation of aldehydes to carboxylic acids is a two-step procedure. In the first step, one mole of water is added in the presence of an acidic catalyst to generate a hydrate and subsequently, the hydrate is oxidized to the carboxylic acid: formally by eliminating water. This oxidation mechanism can be directly applied to the PO, because PO also contains high amounts of aldehydes, ketones and phenols. Conversion of these functional groups to corresponding carboxylic acids will also favour the subsequent esterification reaction and also helps to suppress their concentration in the final product.

Pre-Treatment

Figure 3:
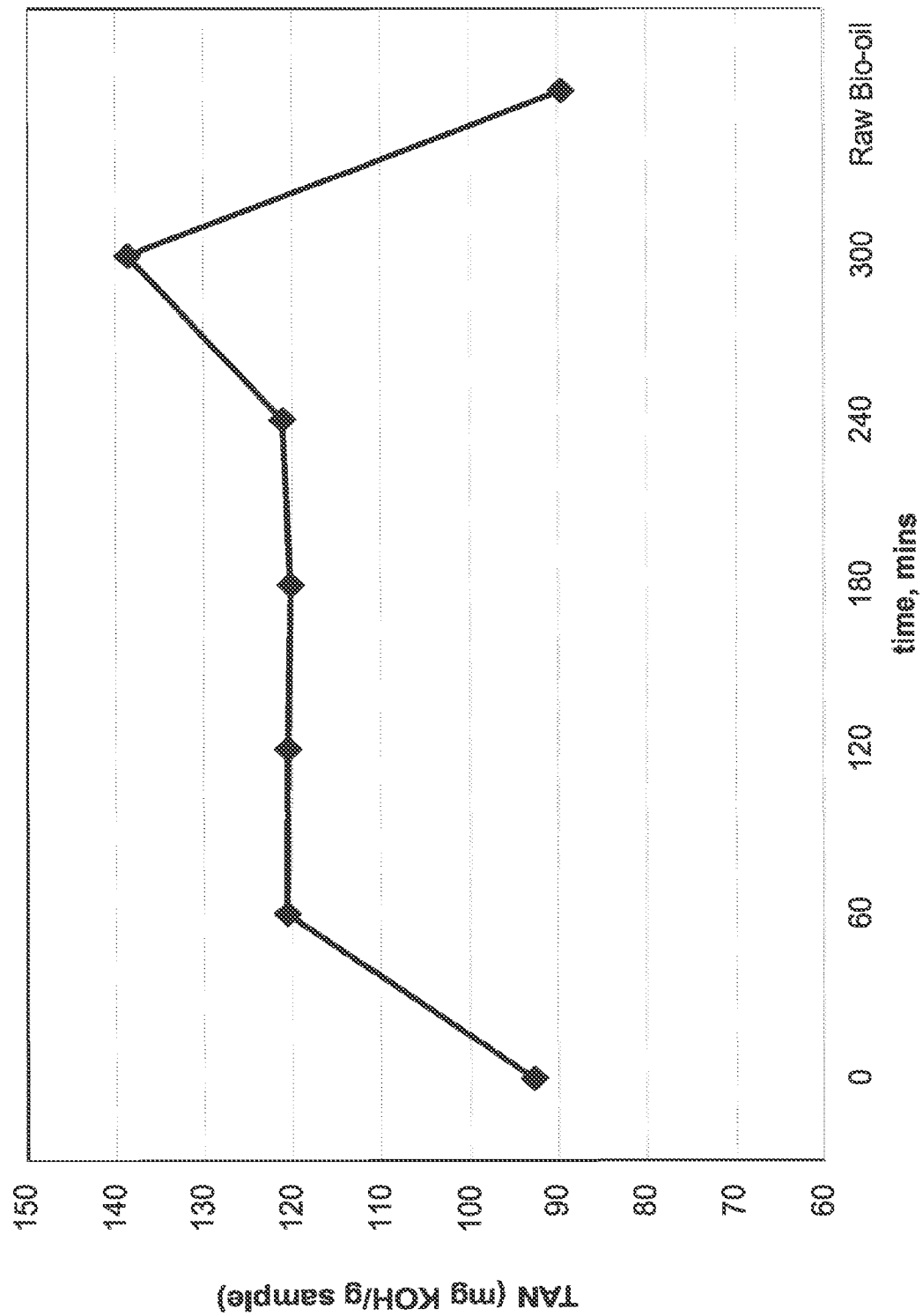
FIG. 3: Effect of PO oxidation with oxidizing agent over time

From FIG. 3, it is clearly evident that addition of oxidizing agent (5% mass fraction of hydrogen peroxide) wilt increase the total acid number of the PO (90 to 139 mgKOH/g) at suitable reaction conditions (65° C.; 1 hr). For oxidising or pre-treatment of the PO, any active oxygen species can be used. The oxidizing agents used in this process include but are not limited to the following and may also contain mixture thereof i.e. ozone, hydrogen peroxide, sulphuric acid, nitric acid, nitrous oxide, silver oxide, sodium or potassium salts of the peroxomonosulphate ion, or the peroxydisulphate ion or oxygen. Most preferably hydrogen peroxide solution is used as oxidising agent with a solution concentration ranging from 5 to 100% mass ratio but most preferably from 30-50% mass ratio will produce better results. Preferably, the pre-treatment mixture includes at least a minimum 2% mass fraction oxidising agent, with respect to the total weight of the PO mixture. More preferably, the PO mixture includes at least 5%, 10%, 15%, 20%, or 25%, oxidising component. An especially preferred range is from 2-10% w/w of hydrogen peroxide to PO. The reaction time required for the pre-treatment can range from ¼ to 4 hours, preferably from ½-2 hours, but most preferably 1 hour to 2 hours. The pre-treatment reaction temperature can range from 25-100° C., and preferably from 40 to 91° C., but most preferably 40 to 75° C. are preferred.

Esterification

Esterification is a potential route to convert the carboxylic acids in bio-oils to esters by reacting them with alcohols in the presence of an acid or base catalyst medium (Fischer esterification reaction). Following the pre-treatment of the PO, a pre-treated pyrolysis oil (PPO) is produced. The PPO mixture is subsequently esterified with a suitable alcohol and catalyst in effective reaction conditions to produce phase separation. The reaction time required for the esterification can range from % to 4 hours, preferably from ½-3 hours, but most preferably 1 hour to 2 hours. The pre-treatment reaction temperature can range from 25-120° C., and preferably from 40 to 91° C., but most preferably 55 to 75° C. are preferred.

There is a correlation between the amount of alcohol required and the % mass ratio of pyrolignin present in the feed to achieve the phase separation including other reaction variables.

The most common method of estimating the % mass ratio of pyrolignin content in the PO is by extraction and separation using water. For example, PO (~100 g) was added drop wise to 500 ml of ice-cooled distilled water under stirring at 5000 r/min with a homogenizer. After stirring for 1 h, the precipitated lignin was filtered and washed. The filtered lignin was re-suspended in 500 ml of ice-cooled water and stirred for 4 h. Finally, the solution was filtered and the pyrolignin was air dried at room temperature and weighed to yield the % mass ratio of pyrolignin of the particular PO feed.

It will be understood that the PO may comprise 10% mass ratio to 50% mass fraction pyrolignin with respect to the total weight of the PO feed used and this proportion depends on the type of feedstock used and production parameters of the pyrolysis reactor systems such as moisture content of the biomass, pyrolysis temperature, pyrolysis residence time etc.

Determination of the Amount of Alcohol Required for the Phase Separation:

depending on the type of PO used, the mixture may include or require 10% mass ratio or more of alcohol with respect the amount of pyrolignin present. Preferably the mixture comprises 50% or less, 45% or less, 40% or less, 35% or less, 30% or less, 25% or less, 20% or less, 15% or less, with respect to the PO feed and also the % mass ratio of the pyrolignin. Especially preferred is a range of 15-35% w/w of the alcohol with respect to the PO.

Figure 4:
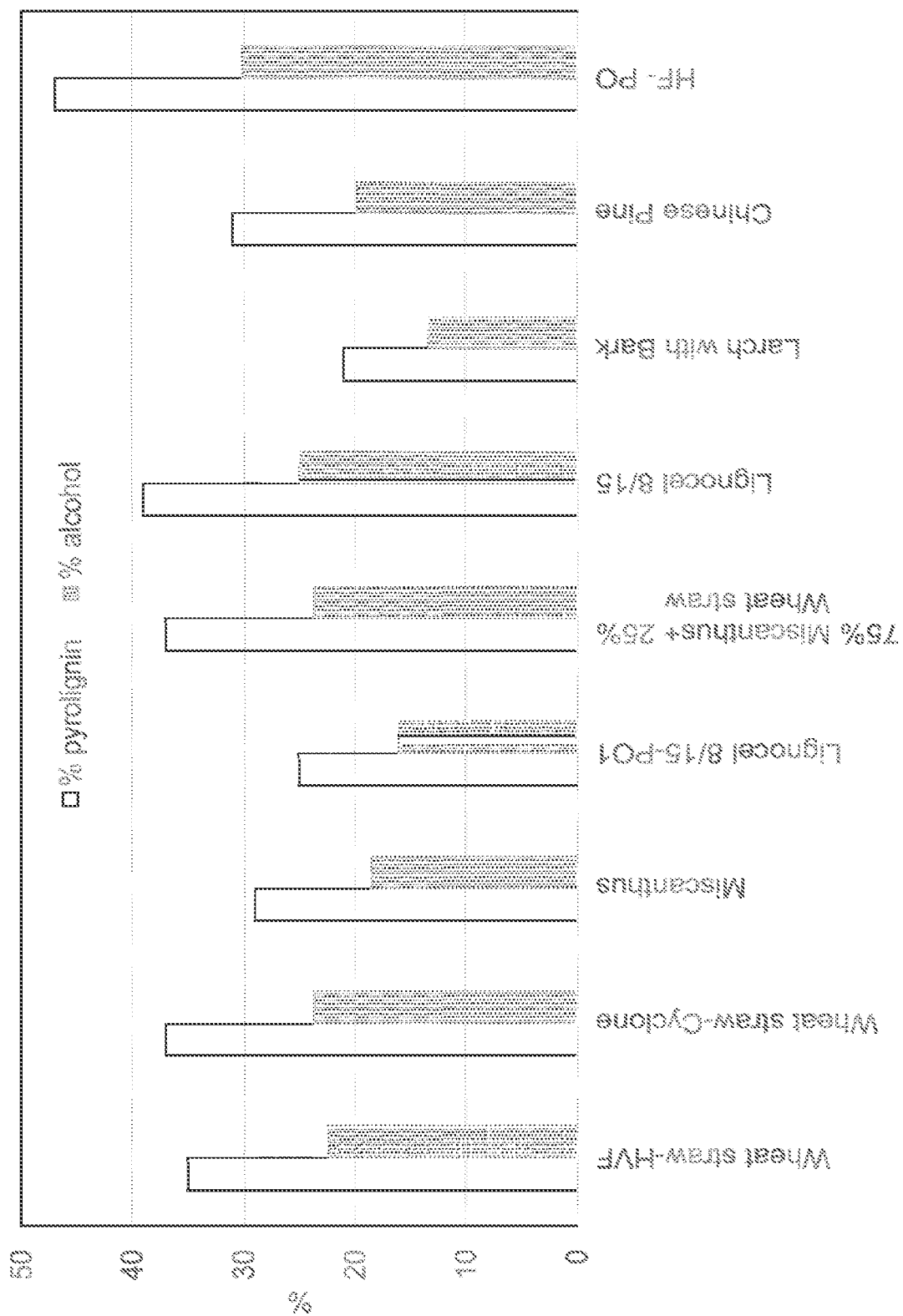
FIG. 4: Estimated mass ratio of alcohol required for phase separation of the PO based on the mass of the pyrolignin

A minimum amount of alcohol is required to effect the phase separation. Amounts in excess of the minimum will increasingly incorporate the aqueous into the organic phase resulting in a single phase mixture at very high levels. Referring to FIG. 4, this demonstrates the relationship on minimum amount of alcohol (e.g. n-butanol) concentration on the amount of pyroliginin as determined for the following feedstocks that include wheat straw, wheat straw with ethanol-cyclone, miscanthus, Lignocel 8/15 (spruce), Lignocel 8/15-PO1, 75% miscanthus+25% Wheat straw, larch with bark, Chinese pine, Lignocel 8/15 heavy fraction of PO (HF-PO). From the exemplary embodiments for effective phase separation of PO at suitable reaction conditions, it was found out that the mass ratio of the alcohol to pyrolignin is in the range of 0.60±0.1.

Alcohol species useful for the processes described herein may include one or more C4-C30 alcohols. Exemplary alcohols used with embodiments described herein include C4-C8 alkyl alcohols. The alcohol, has to demonstrate a significant phase separation with water (i.e. to have limited solubility in water) thus excluding methanol, ethanol and isopropanal; while having a high affinity for the HAF.

Figure 5:
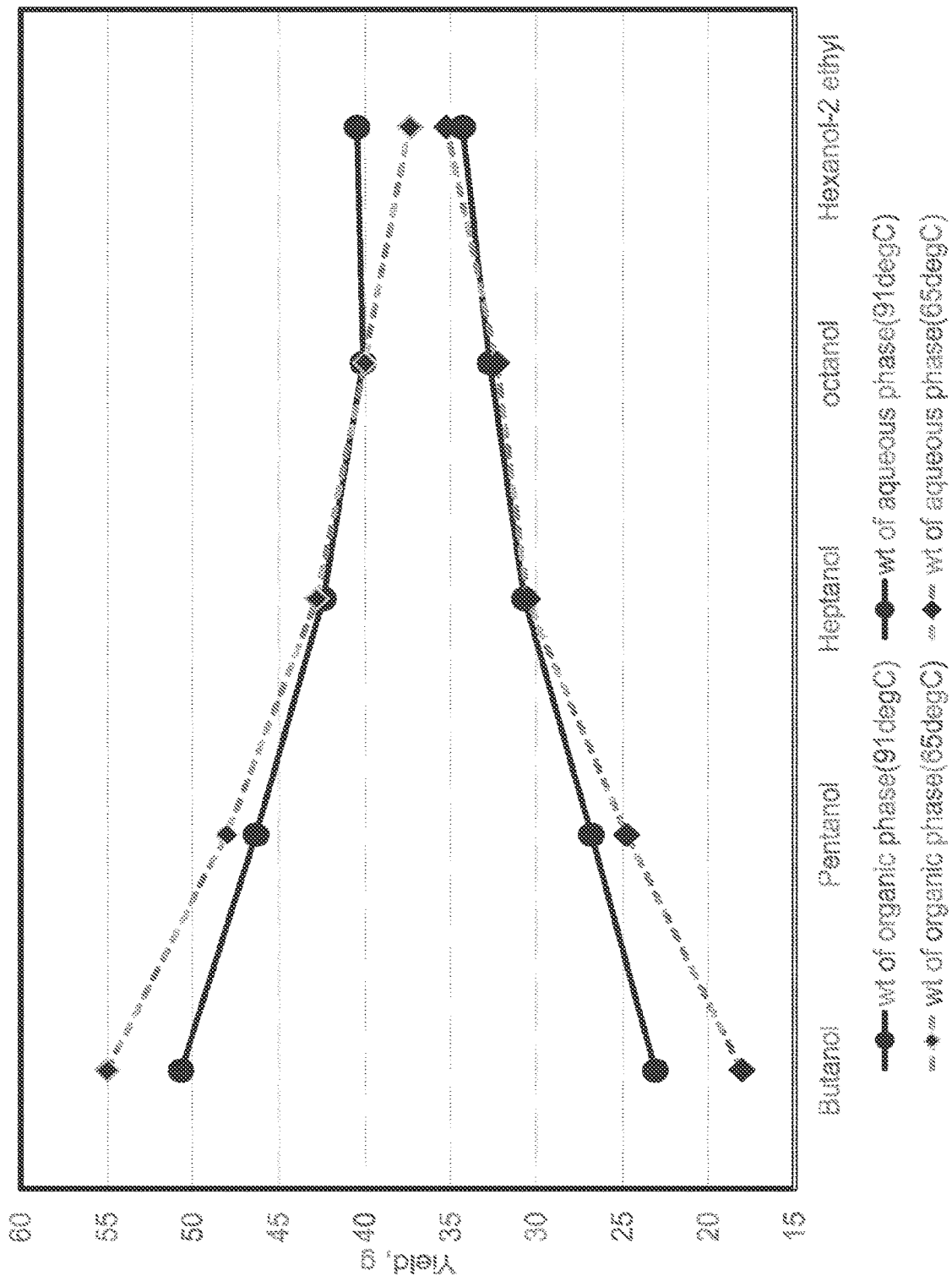
FIG. 5: PO fractionation yields w.r.t. different types of alcohols at 65 and 91° C.

Referring to FIG. 5, PO phase separation has been demonstrated using different alcohol chain types at two different temperature (91 and 65° C.). From FIG. 5, it is clearly evident that as the length of carbon chain of the alcohol increases more effective phase separation is observed. This implies that, more water or aqueous fraction is phase separated with the increase in carbon chain of the alcohol. From this it also inferred that water content in the phase separated organic phase decreases. Also there is a very little variance between the two temperatures tested in regards to the yields of the phase separated products. A very minor increase of the aqueous fractions was observed in case of the 91° C. experiments. The effective phase separation using alcohol types used in are as follows, ethyl hexanol>octanol>heptanol>pentanol>butanol. It is also worth mentioning that, phase separation did not occur for the alcohols below C4 (methanol, ethanol, propanol) also with the other isomers of the butanol family (iso-sec-and tert-).

Alcohols used with embodiments disclosed herein may also include those formed from biomass through fermentation processes. Therefore, alcohols used with embodiments herein may be derived from industrial processing wastes, food processing wastes, mill wastes, municipal/urban wastes, forest products and wastes, agricultural products and agricultural wastes, amongst other sources.

In the CSTR embodiment of the current invention, the mass ratio of the alcohol to pyrolignin is in the range of 0.60±0.1. In the case of the CUR embodiment of the current invention, the mass ratio of the alcohol to pyrolignin is in the range of 0.50±0.1. This reduction is attributed to the intense mixing caused by the ultrasound.

Figure 6:
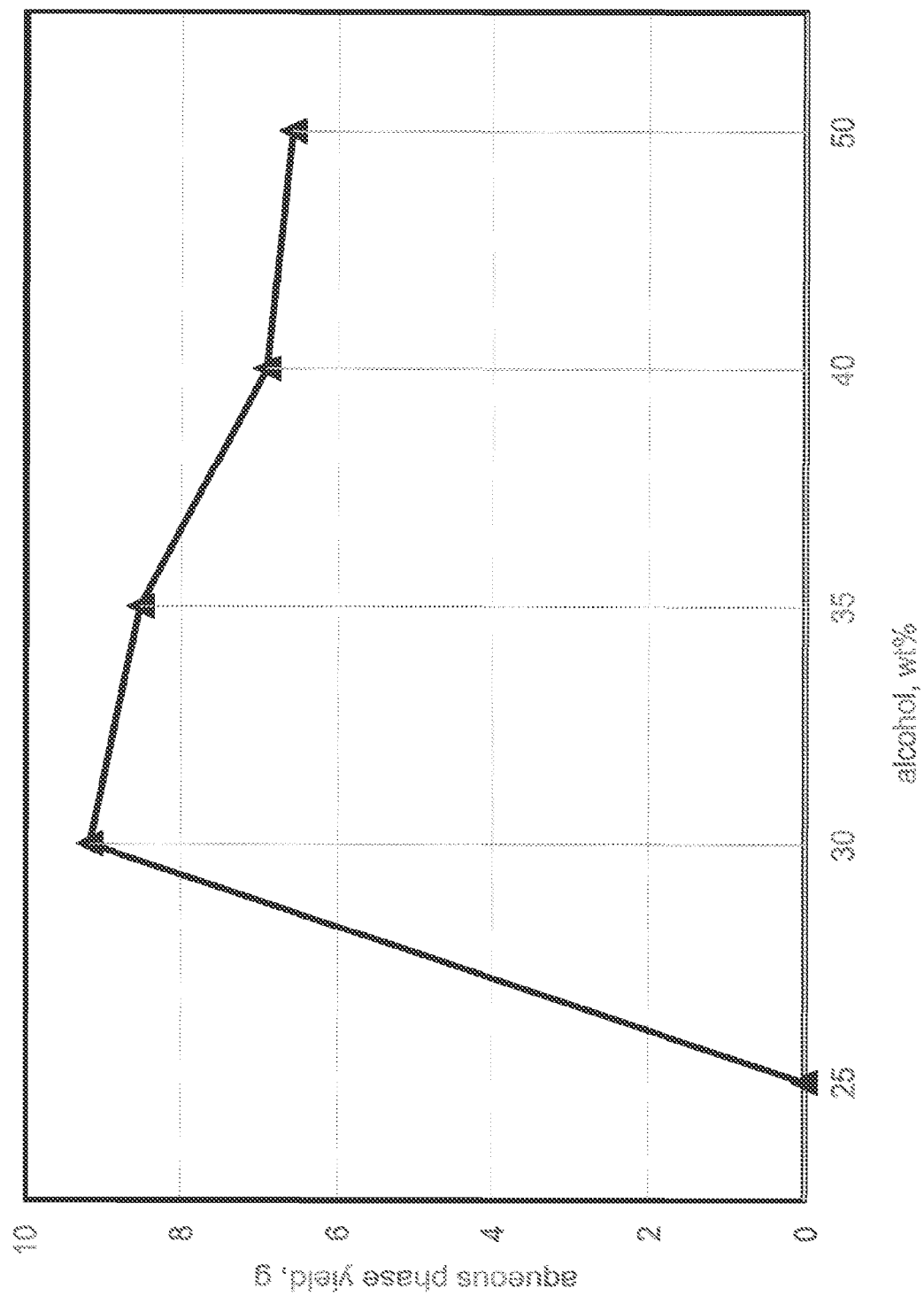
FIG. 6: HF-PO fractionation yields w.r.t. different types of alcohols at 91° C.

In a demonstration of the method for a phase separated PO. The received PO was in two phases, the upper aqueous phase was decanted and the heavy fraction PO (HF-PO) was used to check the correlation between the amount of alcohol and the phase disaggregation and the aqueous phase yield in the current invention. For the HF-PO used as a feedstock with an initial water content of ~10% and the measured pyrolignin content was ~47%. From FIG. 6, it is clearly evident that the minimum ratio of alcohol required to produce phase separation is ~30%. This is in complete agreement with the alcohol values described in FIG. 4 for homogenous single phase PO. Also, it is observed that below the 30% Level, no phase separation is observed and above the 30% level, phase separation is observed but decrease in the aqueous phase yield is noticed. This is mainly attributed to the partial solubility of the n-butanol (77 g/l) in water and vice versa.

In at least one embodiment, the esterification reaction of pre-treated PO (PPO) or PO is carried out in the absence of a catalyst. According to another embodiment of the invention, the esterification reaction of the pre-treated PO or PO is carried out in the presence of a catalyst such as but not limited to liquid acid/base catalyst. In one embodiment the catalyst component useful for the process described herein may include one or more of the following but not limited to any or mixture thereof. The catalyst can be: a homogenous or heterogeneous form acid or base (e.g. $H_2SO_4$, p-Toluene sulphonic acid (PTSA or pTsOH) sulphuric acid, nitric acid, glacial acetic acid, phosphoric acid, sodium hydroxide, potassium hydroxide, barium hydroxide or heterogeneous acids or bases (e.g. Amberlite resin, Zeolites, benzoic acid, alumina, silica-alumina, titanic, and zirconia), and mixtures thereof typically used in esterification reactions. A neutral catalyst can also be used. Typically a catalyst is present in an amount of from 0.01-5% w/w and preferably 0.05-1% w/w with respect to the PPO.

In the CSTR embodiment of the current invention, the mass ratio of the catalysts to PO is 0.001 to 0.1. In the case of CUR embodiment of the current invention, the mass ratio of the alcohol to pyrolignin is reduced by approximately 25%.

In an embodiment of the present invention the PPO or PO is reacted with the feed comprising one or more of the alcohol species at a temperature between 25° C. and 120° C., and preferably at a temperature of from 40-91° C. and a pressure determined by the vapour pressure of the mixture at that specific temperature.

In certain embodiments, the PPO or PO is reacted with the alcohol and catalyst or mixture of alcohols and catalysts, for a length of time sufficient for esterification reaction to reach a desired level of completion. This will, in turn, depend on the various factors including temperature of the reaction, type of the reactor system used, the chemical nature/surface area of the catalyst, and the contact time with the catalyst and like.

In an embodiment, the duration of the reaction is between about 5 minutes to 300 minutes. In another embodiment, the duration of the reaction is between about 30 minutes to 240 minutes. In yet another embodiment, the duration of the reaction is between about 60 minutes to 120 minutes.

The reactions described in this document are carried out in any system of suitable design, including systems comprising batch, semi-batch, continuous-flow (such as CSTR and plug flow reactors) and also batch and continuous-flow high throughput ultrasonicator reactors.

Analytical Methods

Viscosity

Viscometric measurements were performed at 40° C. with a Brookfield DV-II+ Pro viscometer with small sample adaptor and spindle SC4-18.

Heating Value Measurements

To determine the higher heating value (HHV) of the bio-fuels and different phases, approximately 1 g of samples were burned in an IKA C5003 type bomb calorimeter under 30 bar oxygen pressure and in dynamic method of operation. Standardisation and thermochemical corrections followed the ASTM D 240 test method. Samples with high water content were combusted with paraffin strips as spiking material (45.78 MJ/kg).

TAN and Water Analyses

The total acid number (TAN) and water content of the fuel samples were determined by Aqumax TAN and Aquamax KF Volumetric titrators (GRScientific) according to ASTM D 664 and ASTM E 203 standards.

CHN

The elemental composition analysis of the samples (C, H and N) was carried out at 900° C. by a Flash 2000 analyser and the oxygen content (O) was calculated by difference.

GC-MS Analysis

Sugar compounds were analysed by gas chromatography-mass spectrometry (Agilent 7890A GC-MS) after a standard trimethylsilylation with HMDS. The injection unit temperature of the GC was 300° C. and it was coupled to a HP-VOC column (60 m×0.2 mm, 1.12 µm). The GC oven was heated from 45° C. to 280° C. at a rate of 3° C./min while the system was purged with helium carrier gas with a split ratio of 25. Separated compounds were recorded with the Agilent 5975C mass selective detector with ionisation energy of 70 eV and a scanning range of m/z 30-550 in the full scan mode.

EXAMPLES

Example 1

100 grams of PO with ~39% mass faction of measured pyrolignin was placed into a 500 ml autoclave equipped with a magnetic stirrer. To this approximately 2-10% mass ratio of oxidizing agent (hydrogen peroxide) was added with stirring and heating simultaneously at 40-70° C. for the duration of 30-90 minutes. After the pre-treatment, to the resultant oxidised product, a 15-40% mass ratio of higher boiling point alcohol (1-butanol) and 0.1-0.5% mass ratio of acid catalyst (sulphuric acid) were added with continuous stirring (~1000 rpm) and heating at 40-100° C. for the duration of the 120-240 minutes or less. After cooling the reaction mixture to ambient, the liquid product consisted of two phases: an organic phase and an aqueous phase. These phase separated products were centrifuged to obtain a clean separation of the organic and aqueous phases. The organic phase was subsequently distilled. Distillation yields a two-phase liquid product, a top light yellow organic phase and minor amount of colourless aqueous phase. The HAF will remain in the distillation flask. Similarly, the aqueous phase of the esterification reaction was put in a separatory funnel, and an equal amount of ether was slowly added and funnel was shaken for several minute and then allowed to rest for approximately 30 min. The solution separated into two layers. The upper layer and bottom layer were designated the ether-soluble fraction (ES) and the ether-insoluble fraction (EIS), respectively. The ether was removed under reduced pressure with a rotary evaporator. Dichloromethane, equal quantity was added into the EIS, and the mixture was shaken for several minutes before being allowed to sit for approximately 30 min. The mixture gradually separated into two layers. The bottom layer was designated as the dichloromethane-soluble fraction of EIS (DCMS) and the upper layer was the dichloromethane-insoluble fraction of the EIS (DCMIS). The layers were separated and the dichloromethane was removed under the pressure with a rotary evaporator. Subsequent distillation of the DCMIS fraction yields high amount of pyrolytic sugars and water as by-product. Also, subsequent distillation of both the ES fraction and DCMS fraction yields high amount of phenolics and solvent as by-product and it will be further recycled to use for extraction purposes.

The typical product yields from this process are HAF (50-70% mass ratio), pyrolytic sugars (15-25% mass ratio), phenolics (8-12% mass ratio) and remainder is the water content. These yields mostly depend on the type of biomass feed used to produce the PO, and vary between feed to feed. Table 1 shows the comparison of properties of crude PO and HAF such as viscosity, HHV, Total acid number (TAN), water content and elemental analysis.

TABLE 1

Comparison of physical and chemical properties of crude PO and HAF.

| Property | Crude PO | HAF | Units |
| --- | --- | --- | --- |
| Total acid number | 111.85 | 88.15 | mgKOH/g |
| Water mass fraction | 21.93 | 1.60 | % |
| Density | 1.12 | 1.15 | g/ml |
| High heating value, dry basis | 17.00 | 27.00 | MJ/kg |
| C mass fraction | 41.68 | 62.61 | % |
| H mass fraction | 7.61 | 7.40 | % |
| O mass fraction (by difference) | 50.70 | 29.99 | % |
| Viscosity at 40° C. | 22.60 | 268 | mPa · s |

Example 2

100 grams of HF-PO with ~47% mass faction of measured pyrolignin was placed into a 500 ml autoclave equipped with a magnetic stirrer. To this approximately 2-10% mass ratio of oxidizing agent (hydrogen peroxide) was added with stirring and heating simultaneously at 40-70° C. for the duration of 30-90 minutes. After the pre-treatment, to the resultant oxidised product, a 15-40% mass ratio of higher boiling point alcohol (1-butanol) and 0.1-0.5% mass ratio of acid catalyst (sulphuric acid) were added with continuous stirring (~1000 rpm) and heating at 40-100° C. for the duration of the 120-240 minutes or less. After cooling the reaction mixture to ambient, the liquid product consisted of two phases: an organic phase and an aqueous phase. These phase separated products were centrifuged to obtain a clean separation of the organic and aqueous phases. Further the products were recovered using the same procedure as described in Example 1. The typical product yields from this process are HAF (50-70% mass ratio), pyrolytic sugars (15-25% mass ratio), phenolics (8-12% mass ratio) and reminder is the water content. These yields mostly depend on the type of biomass feed used to produce the PO, it varies between feed to feed.

Example 3

100 grams of PO with ~39% mass faction of measured pyrolignin was placed into a 500 ml autoclave equipped with a magnetic stirrer. To this approximately 2-10% mass ratio of oxidizing agent (hydrogen peroxide) was added with stirring and heating simultaneously at 40-70° C. for the duration of 30-90 minutes. After the pre-treatment, to the resultant oxidised product, a 15-40% mass ratio of higher boiling point alcohol (1-butanol) and 0.1-0.5% mass ratio of acid catalyst (sulphuric acid) were added with continuous stirring (~1000 rpm) and heating at 40-75° C. for the duration of the 120-240 minutes or less. After cooling the reaction mixture to ambient, the liquid product consisted of two phases: an organic phase and an aqueous phase. These phase separated products were centrifuged to obtain a clean separation of the organic and aqueous phases. Further the products were recovered using the same procedure as described in the Example 1.

The typical product yields from this process are HAF (50-70% mass ratio), pyrolytic sugars (15-25% mass ratio), phenolics (8-12% mass ratio) and remainder is the water content. These yields mostly depend on the type of biomass feed used to produce the PO, it varies between feed to feed.

Example 4

100 grams of HF-PO with ~47% mass faction of measured pyrolignin was placed into a 500 ml autoclave equipped with a magnetic stirrer. To this approximately 2-10% mass ratio of oxidizing agent (hydrogen peroxide) was added with stirring and heating simultaneously at 40-70° C. for the duration of 30-90 minutes. After the pre-treatment, to the resultant oxidised product, a 15-40% mass ratio of higher boiling point alcohol (1-butanol) and 0.1-0.5% mass ratio of acid catalyst (sulphuric acid) were added with continuous stirring (~1000 rpm) and heating at 40-75° C. for the duration of the 120-240 minutes or less. After cooling the reaction mixture to ambient, the liquid product consisted of two phases: an organic phase and an aqueous phase. These phase separated products were centrifuged to obtain a clean separation of the organic and aqueous phases. Further the products were recovered using the same procedure as described in the Example 1.

The typical product yields from this process are HAF (50-70% mass ratio), pyrolytic sugars (15-25% mass ratio), phenolics (8-12% mass ratio) and remainder is the water content. These yields mostly depend on the type of biomass feed used to produce the PO, it varies between feed to feed.

Example 5

400 grams of HF-PO with ~47% mass faction of measured pyrolignin was placed into a 4 litre reservoir of the continuous high throughput ultrasonicator reactor. To this approximately 2-10% mass ratio of hydrogen peroxide was added with continuous sonication (100% amplitude and 100% power) with the flow rate ranging from 0.3-2 l/min for 30-90 minutes. After the pre-treatment, the resultant oxidised product, a 15-40% mass ratio of higher boiling point alcohol (1-butanol) and 0.1-0.5% mass ratio of acid catalyst (sulphuric acid) were added with continuous 100% amplitude and 100% power) with the flow rate ranging from 0.3-2 l/min for 30-90 minutes. Ultrasonic irradiation causes cavitation of bubbles near the phase boundary between the alcohol and the oil phase. The collapse of the cavitation bubbles disrupts the phase boundary and causes emulsification, by ultrasonic jest that impinge one liquid to another. The cavitation may also lead to the localized increase in temperature at the phase boundary enhancing esterification reaction. Neither agitation nor heating required to produce esterified product by ultrasonic application because of formation of micro jets and localized temperature increase. After cooling the reaction mixture to ambient, the liquid product consisted of two phases: an organic phase and an aqueous phase. These phase separated products were centrifuged to obtain a clean separation of the organic and aqueous phases. Further the products were recovered using the same procedure as described in the Example 1.

The typical product yields from this process are very similar to those of CSTR as shown in example 1. Also the ultrasonication assisted process requires ~25% less alcohol and 50% less catalysts components required to produce effective phase separation compared with the CSTR.

Example 6

Figure 7:
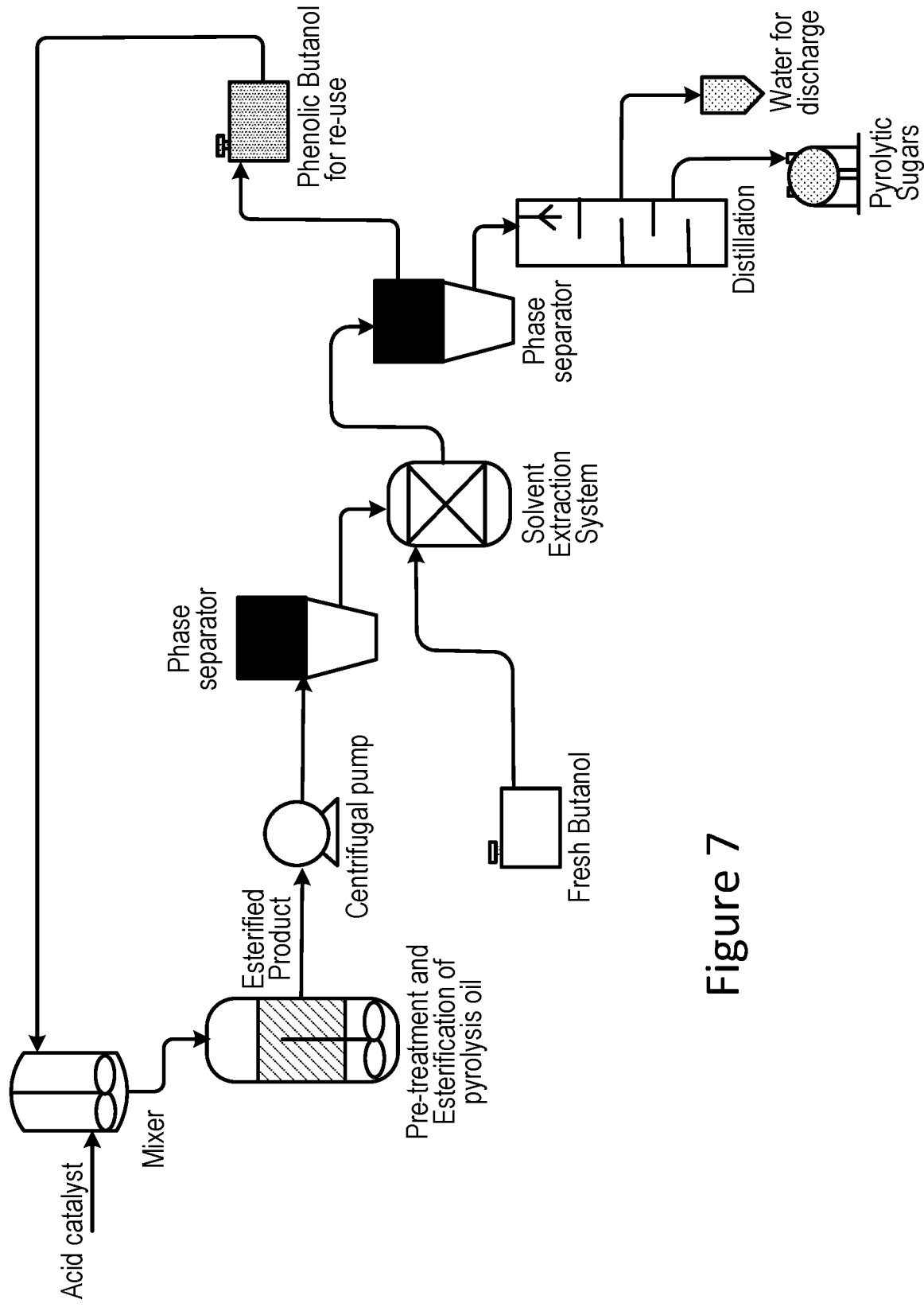
FIG. 7: Schematic for the usage of phenolic butanol mixture with butanol as the solvent

100 grams of PO with ~39% mass faction of measured pyrolignin was placed into a 500 ml autoclave equipped with a magnetic stirrer. To this approximately 2-10% mass ratio of oxidizing agent (hydrogen peroxide) was added with stirring and heating simultaneously at 40-70° C. for the duration of 30-90 minutes. After the pre-treatment, to the resultant oxidised product, a 15-40% mass ratio of phenolic butanol mixture and 0.1-0.5% mass ratio of acid catalyst (sulphuric acid) were added with continuous stirring (~1000 rpm) and heating at 40-75° C. for the duration of the 120-240 minutes or less. After cooling the reaction mixture to ambient, Phenolic butanol is a product which is obtained by mixing the butanol or any alcohol with the phase separated aqueous fraction of a previous esterification reaction. The addition of butanol to the aqueous fraction will extract the phenolics present therein and leaving behind the pyrolytic sugars in the aqueous solutions. Subsequently the two phases were separated using a separating funnel. FIG. 7. shows the schematic representation of the use of phenolic butanol in the process.

The resulting phenolic butanol or phenolic alcohol is added to the oxidised or pre-treated product for further esterification reaction. After cooling the reaction mixture to ambient, the liquid product consisted of two phases: an organic phase and an aqueous phase. These phase separated products were centrifuged to obtain a clean separation of the organic and aqueous phases. After phase separating the liquid products, the phases were subsequently separated, extracted and distilled to yield HAF, pyrolytic sugars and phenolics. The typical product yields from this process are HAF (50-70% mass ratio), pyrolytic sugars (15-25% mass ratio), phenolics (8-20% mass ratio) and remainder is the water content. Also the phenolic butanol assisted process produces 30% more pyrolytic sugars and does not require any additional extraction solvents (ether or DCM) than the regular process. Phenolic butanol or phenolic alcohol can be used similarly to any alcohols in any type of reactor systems.

Example 7

100 grams of HAF with 5% mass ratio ruthenium on carbon catalysts were loaded into a CSTR, whose maximum volume is 500 cm$^3$. After purging, using $N_2$ gas, 3 times, the pressure in the autoclave is raised to the required operational pressure i.e. approximately 95 bar using $H_2$ at room temperature. Subsequently, the reaction variables such as operating temperature (350° C.) is set, reaction time (3 hrs), stirring rate (1000 rpm) and gas flow rates were set using specview software. The pressure was recorded automatically during the course of the reaction by the software with the help of a digital pressure transducer attached to the reactor. After the completion of the reaction, the autoclave will be cooled down to room temperature. The products were filtered and submitted for the analysis.

The typical yields from this process are 75-85% tight hydrocarbon phase, 10-15% aqueous phase and the remainder is the gas phase. Occasionally char is also observed, but this mostly depends on the type of catalyst used and the reaction variables. Table 2 shows the properties of tight HDO product obtained in the hydrotreating process.

TABLE 2

Physical and chemical properties of HDO product light hydrocarbon phase

| Property | HDO top-organic phase | Units |
| --- | --- | --- |
| Total acid number | 30 | mgKOH/g |
| Water mass fraction | 0.5 | % |
| Density | 950 | g/ml |
| High heating value (HHV), dry basis | 34 | MJ/kg |
| C mass fraction | 70.62 | % |
| H mass fraction | 9.16 | % |
| O (by difference) | 20.22 | % |

With respect to the organic phase then HAF is usually produced at around 50-70% w/w with respect to the PO. The amount and variety of esters produced depends on the type of PO utilised, but is usually around 10% w/w.

Water makes up around 10% w/w of overall product. Regarding the lower, aqueous phase then this typically contains about 10-25% w/w of pyrolytic sugars with respect to the PO. Also phenolic monomers are present usually at a level of from 10-12% w/w with respect to the PO.

HAF Stability and Fuel Properties

To demonstrate the long-term HAF stability properties, HAF samples were compared with raw PO and stabilised PO samples for water content and viscosity measurements as shown in the TABLE. 3. It is known that the PO ageing and viscosity increase is mainly due to water content and it is believed that the presence of pyrolytic sugars and monomeric phenols and other low molecular weight compounds contributes. For this reason, water content and viscosity measurements were chosen to estimate the stability of the HAF product. It is understood that, the HAF produced from the process has low or nit pyrolytic sugars, water soluble mono-phenolics and molecular bound water.

TABLE 3

HAF stability comparison with respect to PO and stabilised PO.

| Property | PO | Stabilised PO | HAF |
| --- | --- | --- | --- |
| Water content, % | | | |
| Fresh | 23 | 22 | 1.6 |
| After long term stability test | 25 | 23 | 2.0 |
| After accelerated aging test | 14 (phase separation) | 11 (phase separation) | 6.3 (No phase separation) |

TABLE 3-continued

HAF stability comparison with respect to PO and stabilised PO.

| Property | PO | Stabilised PO | HAF |
| --- | --- | --- | --- |
| Viscosity, mPa · S | | | |
| Fresh | 23 | 17 | 269 |
| After long term stability test | 39 | 28 | 343 |
| After accelerated aging test | 7921 | 33684 | 1397 |

The water content of fresh samples (raw PO, PO stabilised with 5% EtOH and HAF) was determined by volumetric Karl Fisher titration (ASTM E203). Both the PO samples had very high water content of >20%, while the produced HAF had less than 2%. The dynamic viscosity of all samples was measured at 40° C. with a rotavisco tester. It is known that PO undergoes polymerisation and polycondensation during prolonged storage, causing increase in water content and in viscosity. Increasing water content leads to phase separation (storage problems) while increased viscosity negatively affects flow properties when pumping or injecting the oil. This phenomenon is clearly evident in TABLE. 3. Two types of stability tests were conducted with the three types of samples: first samples were kept at room temperature in dark closed vials for 3 months before repeating the viscosity and water content analyses. An accelerated aging test was also conducted when the 3 samples were stored at elevated temperature (80° C.) for 4 weeks.

The viscosity of fresh HAF is one magnitude higher than the viscosity of the raw PO (269 and 23 mPa·s, respectively) due to the significant difference in their water content (23 and 1.6%, respectively). Stabilised PO has slightly lower water content (22%) and viscosity (17 mPa·s) due to the diluting effect of the added alcohol.

Long term storage increased the water content of all samples (by 2% for PO, 1% for stabilised PO and less than 1% for HAF). In both PO samples the accelerated aging test resulted in the formation of an oil phase with low water content (11-14%) and a water-rich phase separated from the oil. The HAF sample did not show signs of any phase separation due to a small increase in water content (<5%). Ageing affected the viscosity of all samples and increased 300 times in PO, 2000 times in stabilised PO and 5 times only in HAF. Stability test results indicate that ethanol provides better stability in PO but short term only and HAF possesses stable properties when compared with PO and stabilised PO. This is mainly due to fewer polymerisation and polycondensation reactions indicated by low water content and small increase in viscosity.

Figure 8:
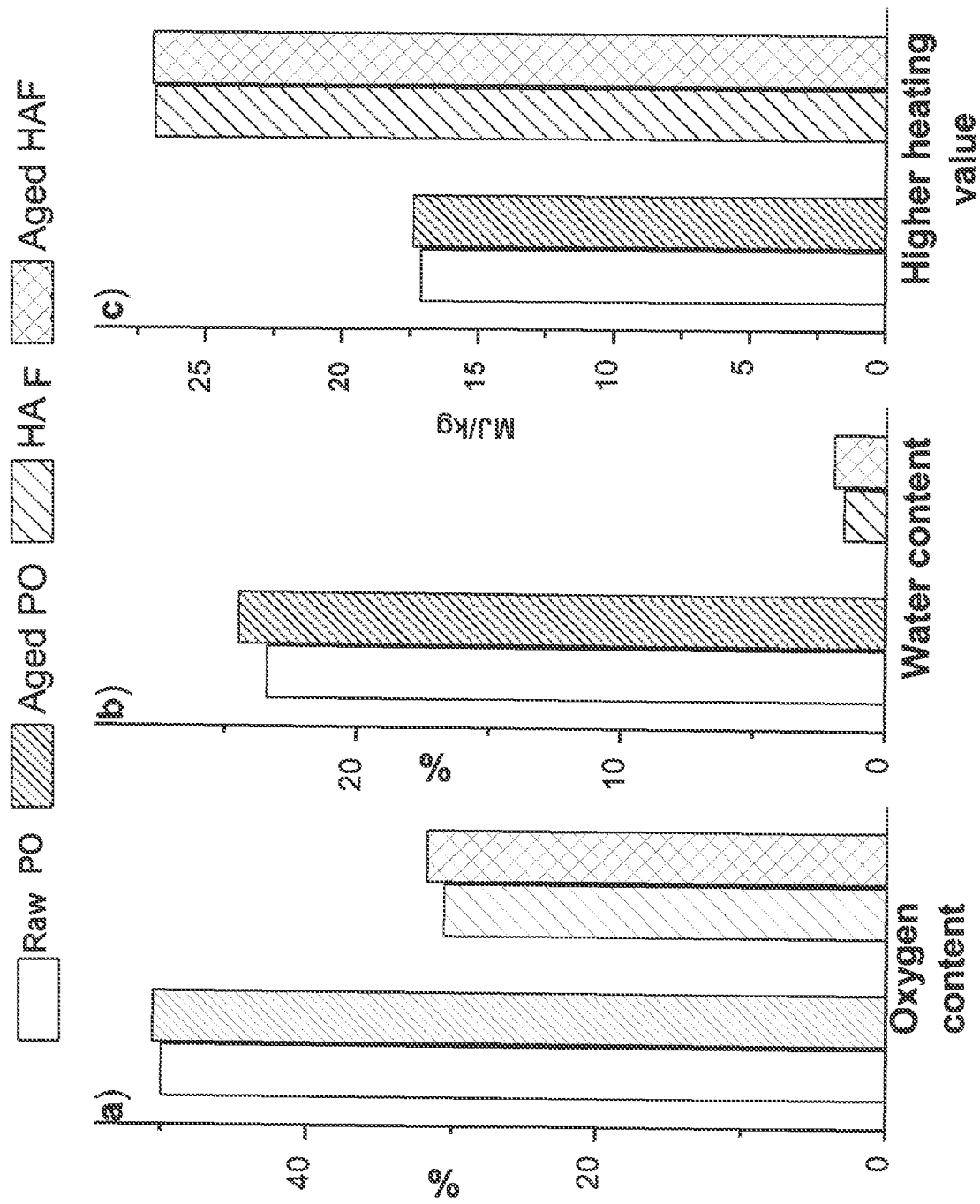
FIG. 8: Comparison of oxygen, water and heating content for the PO, aged PO, HAF and aged HAF samples

The most important fuel property of PO is its heating value which is affected by the elemental composition of the fuel (oxygen content mainly) and water content. High oxygen content and high water concentration decrease the heating value of fuels therefore it is desirable to minimise the values for better fuel properties. FIG. 8, shows the most relevant fuel properties of PO, aged PO and HAF before and after the accelerated aging test. FIG. 8 (C) clearly demonstrates that HAF has 60% increase in higher heating value (27 KJ/kg) when compared with PO (17 MJ/kg). This is mainly due to its lower oxygen content (31 and 50%, respectively) and also contributes to its lower water content (23% and 1.6%, respectively). From preliminary tests it can be concluded that these properties of HAF are not sensitive to storage conditions.

HAF Corrosion Properties

ASTM D665 was followed to estimate the corrosion potential of PO and HAF by immersing standard quality carbon steel rods in the fuel samples for 24 h at 60° C. to determine changes in their weights. The results were shown in the FIG. 9.

Figure 9:
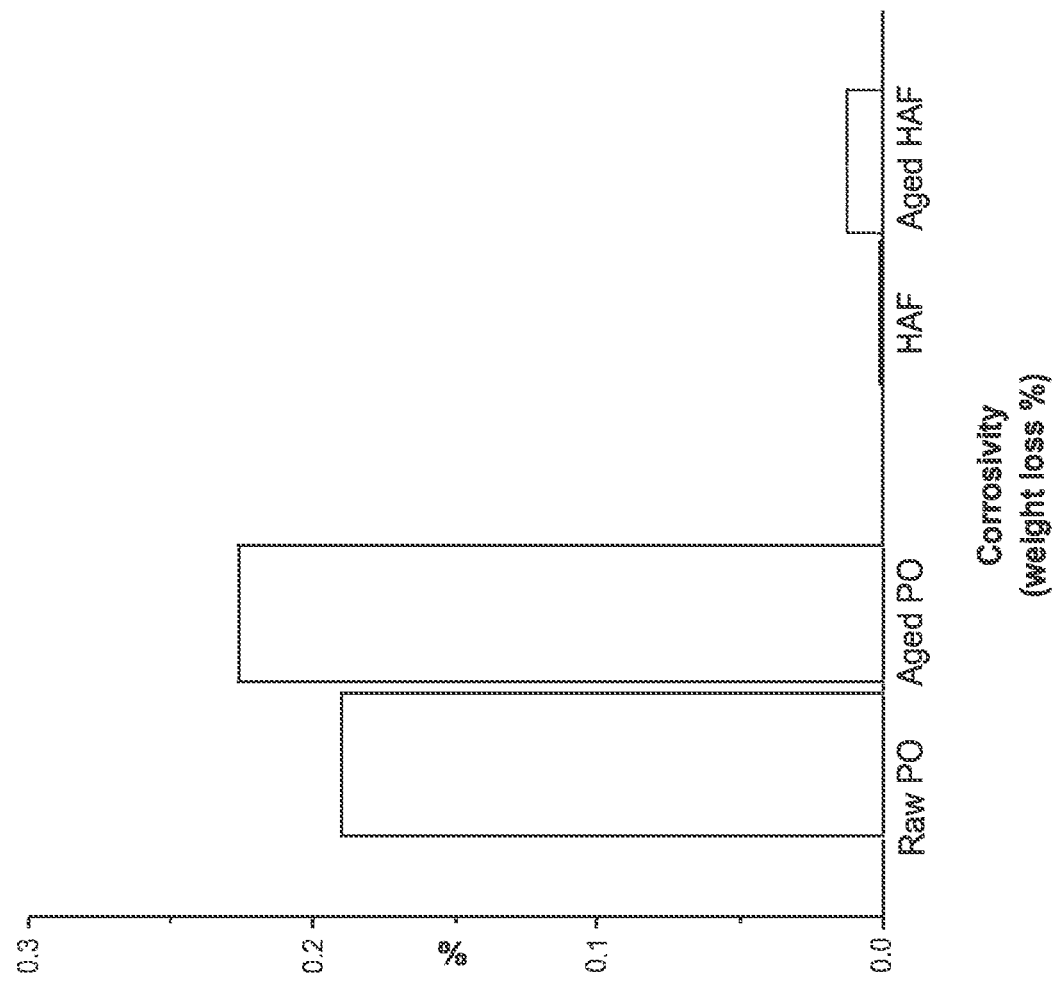
FIG. 9: Comparison of corrosion potential as mass loss for the PO, aged PO, HAF and aged HAF samples

Referring to FIG. 9, both PO and aged PO decreased the weight of the steel rods and resulted in the formation of a solid black residue on the surface. However, HAF and aged HAF had no significant effect on the weight or on the surface of the test rods indicating that HAF is both stable and not corrosive compared to PO.

Pyrolytic Sugars and Mono Phenolics

Figure 10:
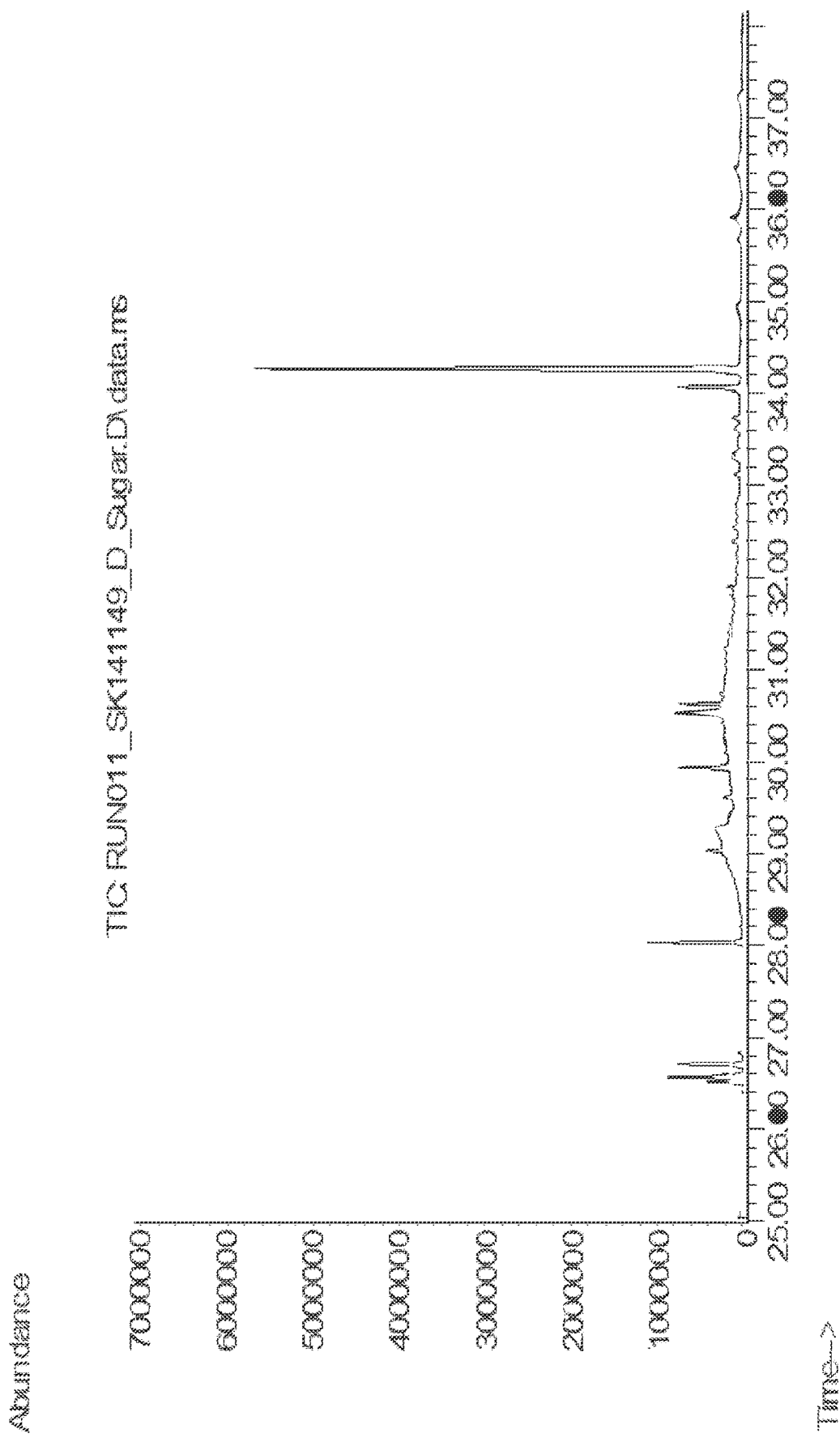
FIG. 10: GC/MS chromatogram of aqueous fraction representing high concentration of LG

Fermentable sugars obtained from lignocellulosic material exhibit great potential as a renewable feedstock for the production of ethanol. Depending on the type of lignocellulosic material used and the operating conditions for the process of pyrolysis, PO can contain up to 26% of 1,6-anhydro-β-D-glucopyranose (Levoglucosan-LG), an anhydrosugars that can be readily hydrolysed to glucose. From the approach, the extraction of LG from the PO via phase separation was investigated and improved. Referring to the FIG. 10, the GC/MS chromatogram, this demonstrates high concentration of LG in the aqueous fractions.

In the current invention, the phase separated products (organic and aqueous) after the esterification reaction are separated. The aqueous phase obtained from the main reaction was treated with concurrent solvent washes to extract the organic compounds present in the fraction prior to its distillation. After the extraction, the two phase's i.e. solvent soluble phase (SSP) and solvent insoluble phase (SIP) were separated by gravity. Further distillation of SIP, yielded a high amount of free flowing dense liquid which is also known as pyrolytic sugars. Further distillation of SSP, yielded monohydro phenolic oligomers as a residue and solvent was recovered and reused.

Figure 11:
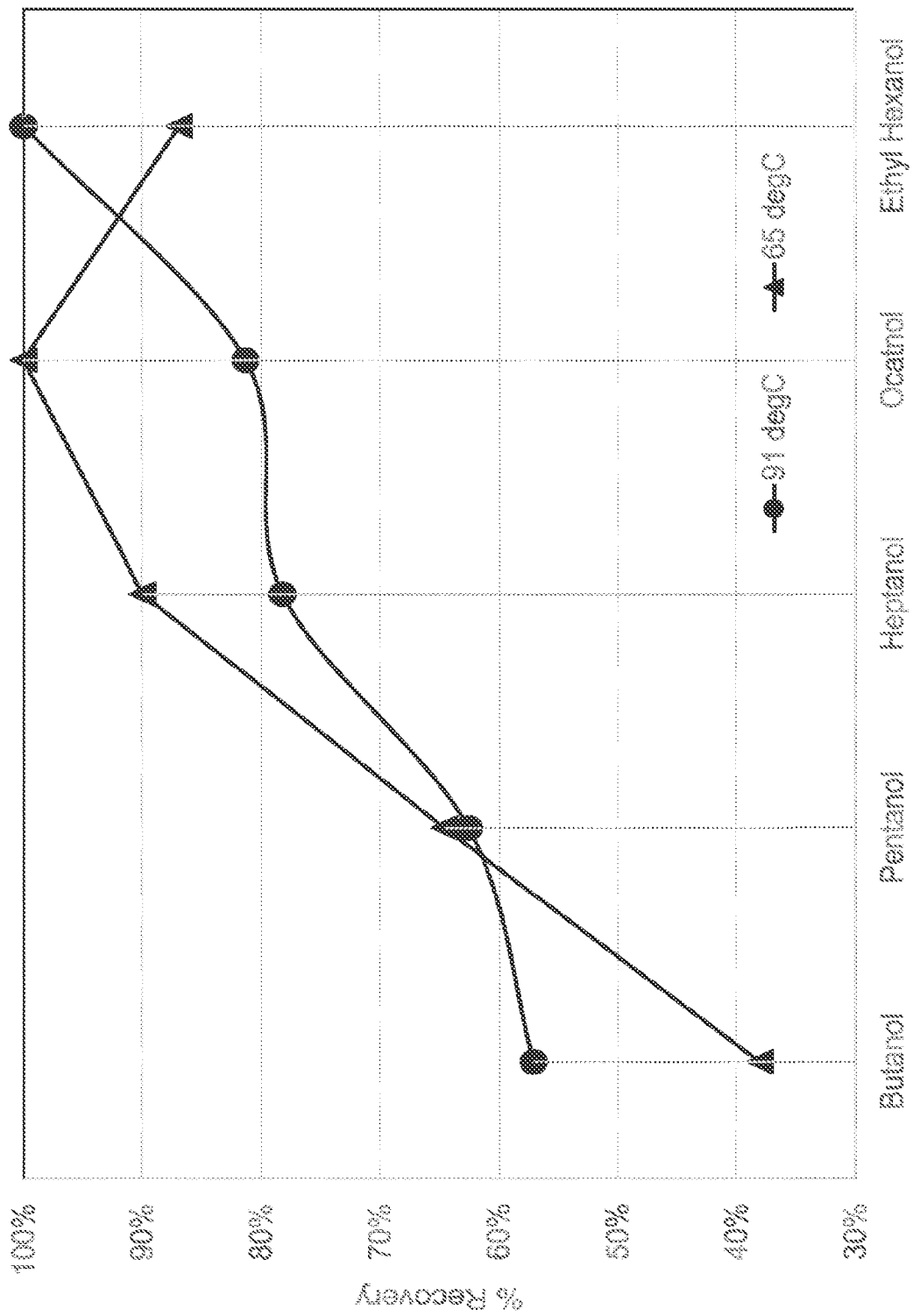
FIG. 11: Pyrolytic sugar recovery w.r.t. different alcohols and temperatures

In an exemplary embodiment and referring to FIG. 11, pyrolytic sugar yields have been demonstrated using different alcohol chain types. From FIG. 5, it is observed that as the length of carbon chain of the alcohol increases more effective phase separation is observed. This directly correlates with the increase in pyrolysis sugar yield observed in FIG. 12. The effective pyrolytic sugar yields obtained using alcohol types used are as follows ethythexanol>octanol>heptanol>pentanol>butanol. Highest amount of pyrolytic sugars (25% mass ratio) are observed for ethylhexanol. It is also understood that, the pyrolytic sugars yields mostly depend on the type of biomass feed used to produce the PO.

Figure 12:
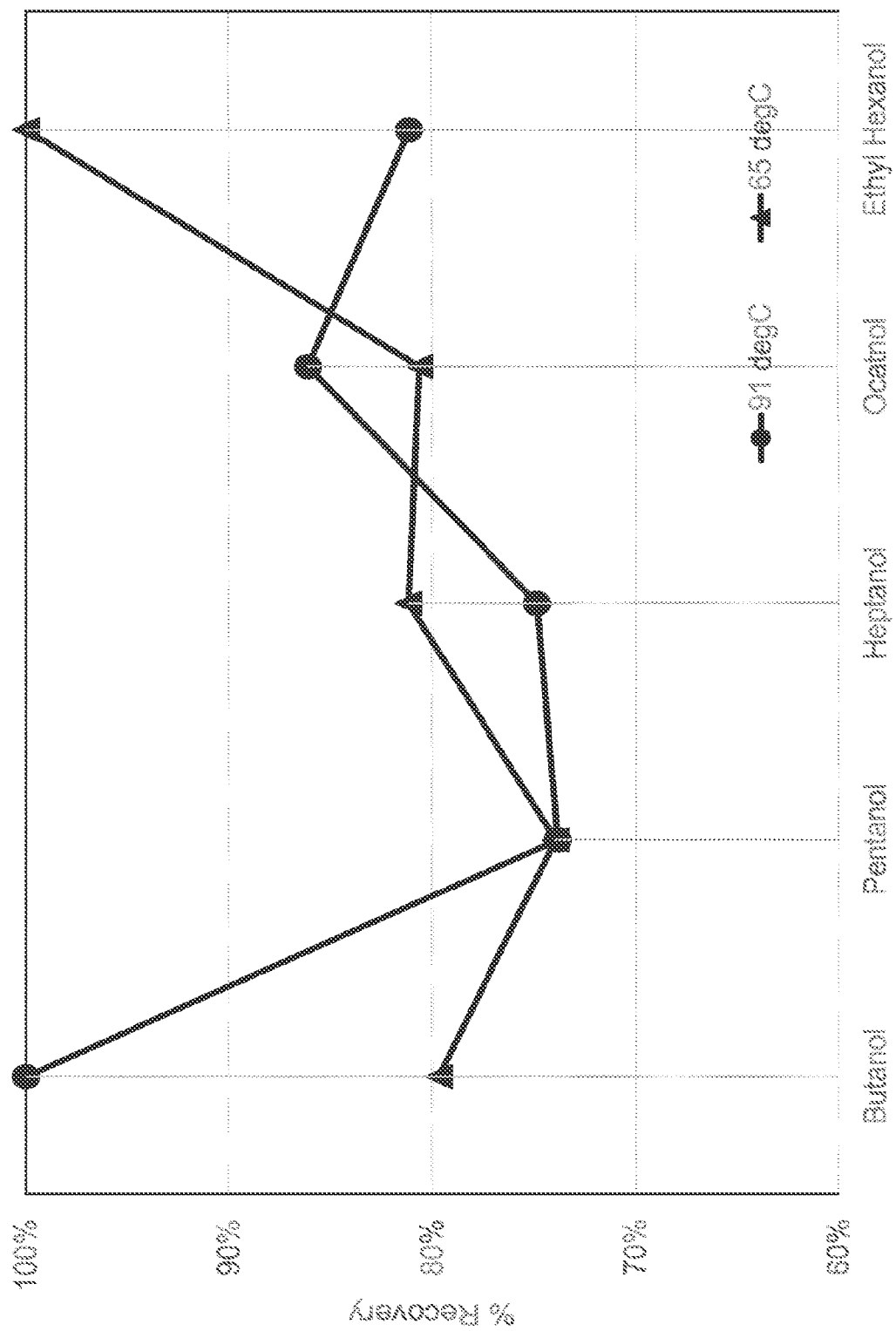
FIG. 12: Phenolic monomers recovery w.r.t. different alcohols and temperatures

In an exemplary embodiment and referring to FIG. 12, phenolics yields have been demonstrated using different alcohol chain types. It is observed the phenolic yields ranging from ~7% mass ratio to 10% mass ratio. The effective pyrolytic sugar yields obtained using alcohol types used are as follows
butanol>octanol>ethylhexanol>heptanol>pentanol.
Highest amount of phenolics (10% mass ratio) are observed for butanol. It is also understood that, the phenolics yields mostly depend on the type of biomass feed used to produce the PO.

The invention claimed is:

1. A process for fractionating pyrolysis oil, the process comprising:
   contacting a feedstock comprising pyrolysis oil with an oxidizing agent to oxidize components in the pyrolysis oil, thereby yielding an oxidized pyrolysis oil; and
   contacting the oxidized pyrolysis oil with an amount of alcohol under conditions effective to yield a mixture comprising:
      an organic phase; and
      an aqueous phase,
   wherein the amount of alcohol is based on an amount of pyrolignin in the pyrolysis oil, and:
   a mass ratio of the alcohol to the pyrolignin is in a range of 0.60±0.1, or
   the amount of the alcohol to the pyrolignin is 10% to 50% by mass.

2. The process of claim 1, wherein the pyrolysis oil comprises 10% to 50% by mass of pyrolignin.

3. The process of claim 1, wherein an amount of the oxidizing agent is 2% to 10% by mass of the pyrolysis oil.

4. The process of claim 1, wherein the alcohol comprises one or more C4-C30 alcohols.

5. The process of claim 1, wherein the alcohol is derived from biomass through fermentation.

6. The process of claim 5, wherein the biomass comprises one or more of industrial processing wastes, food processing wastes, mill wastes, municipal/urban wastes, forest products and wastes, agricultural products and wastes.

7. The process of claim 1, wherein contacting the oxidized pyrolysis oil with the alcohol occurs in the presence of a catalyst.

8. The process of claim 1, wherein contacting the oxidized pyrolysis oil with the alcohol comprises esterifying carboxylic acids in the pyrolysis oil to yield esterification products of the carboxylic acids and the alcohol.

9. The process of claim 1, wherein the organic phase comprises less than 5% by mass of water.

10. The process of claim 1, wherein the aqueous phase comprises water, pyrolytic sugars, organic acids, and phenolic species.

11. The process of claim 1, wherein the organic phase comprises the alcohol, esterification products of the carboxylic acids and the alcohol, and a hydrophobic aromatic component.

12. The process of claim 11, wherein the hydrophobic aromatic component comprises pyrolignin and phenolic species.

13. The process of claim 12, further comprising separating the organic phase and the aqueous phase to yield an organic fraction and an aqueous fraction, respectively.

14. The process of claim 13, further comprising separating the hydrophobic aromatic component from the organic fraction to yield a hydrophobic aromatic fraction.

15. The process of claim 14, wherein the hydrophobic aromatic fraction is free of water and pyrolytic sugars.

16. The process of claim 13, further comprising separating pyrolytic sugars and phenolic species from the aqueous fraction.

17. The process of claim 14, further comprising hydrotreating the hydrophobic aromatic fraction.

18. The process of claim 1, further comprising combining an amount of an additional alcohol with the aqueous phase to yield a phenolic alcohol mixture.

19. The process of claim 18, further comprising combining the phenolic alcohol mixture with an additional amount of oxidized pyrolysis oil.

20. The process of claim 1, wherein the feedstock comprises one or more of woody, herbaceous, agricultural, forestry, and biological materials comprising lignin, cellulose, hemicellulose, or a combination thereof.

21. The process of claim 1, wherein the oxidizing agent is free of ozone.

22. A process for fractionating pyrolysis oil, the process comprising:
- contacting a feedstock comprising pyrolysis oil with an oxidizing agent to oxidize components in the pyrolysis oil, thereby yielding an oxidized pyrolysis oil; and
- contacting the oxidized pyrolysis oil with an amount of alcohol under conditions effective to yield a mixture comprising:
    - an organic phase; and
    - an aqueous phase,
        - wherein the organic phase comprises the alcohol, esterification products of carboxylic acids and the alcohol, and a hydrophobic aromatic component, and the hydrophobic aromatic component comprises pyrolignin and phenolic species;
- separating the organic phase and the aqueous phase to yield an organic fraction and an aqueous fraction, respectively; and
- separating the hydrophobic aromatic component from the organic fraction to yield a hydrophobic aromatic fraction.

23. The process of claim 22, wherein the hydrophobic aromatic fraction is free of water and pyrolytic sugars.

24. The process of claim 22, further comprising hydrotreating the hydrophobic aromatic fraction.

25. The process of claim 22, further comprising separating pyrolytic sugars and phenolic species from the aqueous fraction.

26. The process of claim 22, wherein the feedstock comprises one or more of woody, herbaceous, agricultural, forestry, and biological materials comprising lignin, cellulose, hemicellulose, or a combination thereof.

27. The process of claim 22, further comprising combining an amount of an additional alcohol with the aqueous phase to yield a phenolic alcohol mixture.

28. The process of claim 27, further comprising combining the phenolic alcohol mixture with an additional amount of oxidized pyrolysis oil.

29. The process of claim 22, wherein the oxidizing agent is free of ozone.

30. A process for fractionating pyrolysis oil, the process comprising:
- contacting a feedstock comprising pyrolysis oil with an oxidizing agent to oxidize components in the pyrolysis oil, thereby yielding an oxidized pyrolysis oil; and
- contacting the oxidized pyrolysis oil with an amount of alcohol under conditions effective to yield a mixture comprising:
    - an organic phase; and
    - an aqueous phase,
        - wherein the organic phase comprises the alcohol, esterification products of carboxylic acids and the alcohol, and a hydrophobic aromatic component, and the hydrophobic aromatic component comprises pyrolignin and phenolic species;
- separating the organic phase and the aqueous phase to yield an organic fraction and an aqueous fraction, respectively; and
- separating pyrolytic sugars and phenolic species from the aqueous fraction.

* * * * *